(12) United States Patent
Vasudevan (10) Patent No.: US 7,449,502 B2
(45) Date of Patent: Nov. 11, 2008

(54) INK FORMULATIONS, PRINT SYSTEMS, AND METHODS THEREOF

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

(21) Appl. No.: 11/059,039

(22) Filed: Feb. 16, 2005

(65) Prior Publication Data

US 2006/0094796 A1     May 4, 2006

Related U.S. Application Data

(60) Provisional application No. 60/623,169, filed on Oct. 29, 2004.

(51) Int. Cl.
*C09D 11/00* (2006.01)

(52) U.S. Cl. ...................................... 523/160; 523/161

(58) Field of Classification Search ................. 523/160, 523/161

See application file for complete search history.

(56) References Cited

U.S. PATENT DOCUMENTS 6,406,143 B1 * 6/2002 Chen et al. .................. 347/105
2003/0225185 A1 * 12/2003 Akers et al. ................. 523/160

FOREIGN PATENT DOCUMENTS

| EP | 0 556 649 A | 8/1993 |
| EP | 1 333 068 A | 8/2003 |
| WO | WO 00/20520 A | 4/2000 |

* cited by examiner

*Primary Examiner*—Edward J Cain (57) ABSTRACT

Ink formulations, printer systems, and methods thereof, are disclosed. One exemplary ink formulation, among others, includes a pigment, and a dispersant polymer having at least one monomer unit, wherein the monomer unit has both a hydrogen-bond donor and a hydrogen-bond acceptor.

17 Claims, 5 Drawing Sheets

INK FORMULATIONS, PRINT SYSTEMS, AND METHODS THEREOF

CLAIM OF PRIORITY TO RELATED APPLICATION

This application claims priority to copending U.S. provisional application entitled, "INK FORMULATIONS, PRINT SYSTEMS, AND METHODS THEREOF," having Ser. No. 60/623,169, filed Oct. 29, 2004, which is entirely incorporated herein by reference.

BACKGROUND

Typically, liquid ink includes pigment-based colorants and/or dye-based colorants dissolved or dispersed in a liquid vehicle. Dyes are freely soluble in the liquid vehicle whereas pigments need to be dispersed using dispersants. Dispersants may be small molecules, surfactants or polymeric resins. Dispersants provide stability to dispersions by keeping the pigment particles apart by electrostatic and/or steric repulsion. The dispersants may be covalently attached to the surface of the pigment particles or simply adsorbed by physical forces. Polymeric dispersants are increasingly used in commercial pigment dispersions.

Traditionally, pigment vendors have used the same polymer that works in dispersing one pigment for all pigments. This practice continues for various reasons, including cost effectiveness associated with using one polymer. However, that same polymer may not be able to effectively produce stable dispersions with all the different pigments. For example, inks made with one polymer to form stable cyan and black dispersions may produce less stable yellow dispersions and unstable magenta dispersions.

In addition, pigment vendors have tried increasing the amount of dispersant to increase the stability of the ink formulations. Stability does not always result. Instead, higher viscosity or nozzle health problems may result. Other attempts to improve stability have utilized covalent bonding of polymers to pigments. However, this approach adds to the cost and complexity of the dispersion process.

Accordingly, it would be advantageous to have a rational approach to polymer design for preparing stable ink dispersions.

SUMMARY

Briefly described, embodiments of this disclosure include ink formulations, printer systems, and methods thereof. One exemplary ink formulation, among others, includes a pigment, and a dispersant polymer having at least one monomer unit, wherein the monomer unit has both a hydrogen-bond donor and a hydrogen-bond acceptor.

One exemplary method of stabilizing an ink formulation, among others, includes: providing a pigment; and providing a dispersant polymer having at least one monomer unit, wherein the monomer unit has both a hydrogen-bond donor and a hydrogen-bond acceptor, wherein the hydrogen bond donor and the hydrogen bond acceptor each form hydrogen bonds with the pigment, and wherein the pigment is substantially stabilized.

An exemplary printer system, among others, includes a dispensing system including at least one printhead. The printhead includes an ink formulation that includes a pigment and a dispersant polymer. The dispersant polymer has at least one monomer unit, where the monomer unit has both a hydrogen-bond donor and a hydrogen-bond acceptor.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Ink formulations, printer systems, and methods thereof, are described. Embodiments of the present disclosure substantially increase the stability of pigment formulations by using dispersants that include polymers with at least one monomer unit having both a hydrogen-bond donor and a hydrogen-bond acceptor. Although not intending to be bound by theory, the polymer dispersants are designed to include at least one monomer unit that can form hydrogen bonds with a quinacridone pigment.

Quinacridone pigments are desirable pigments because of their stability with respect to light and air and other beneficial properties. Quinacridone pigments, however, cannot yet be formulated into stable dispersions. Specifically, quinacridone pigments are not stable in conventional polymer dispersants, where hydrophobic groups of the dispersant bind to the pigment surface while hydrophilic polar groups extend into the aqueous phase to provide stability. This instability is caused by the extended hydrogen bonded network of quinacridone pigments. When the polymer peels off of the pigment surface, the pigment particles have a greater tendency to come together and coalesce than to bind to the polymer again.

Although not intending to be bound by theory, the crystal lattice of the quinacridone is formed by internal hydrogen-bond donor-acceptor complexes. (for intra and inter molecular hydrogen bonding in quinacridone crystals, see, Mizuguchi, J. et al Z. Kristallogr. NCS 217 (2002) 525-526 describe crystal structure of Pigment Red 122; for crystal structure of the β phase of unsubstituted quinacridone (PV 19), see, Lincke, G. Dyes and Pigments 52 (2002) 169-181; and for the γ phase, see, Mizuguchi,.J. et al Z. Kristallogr. NCS 217 (2002) 247-248). However, on the outer rim of the lattice, polar groups could still be exposed. Hence, the polymer dispersant may be very loosely bound to the quinacridone crystal lattice. Thus, the polymer dispersant may come "off" at high temperatures. Once the polymer is "off," the quinacridone crystal lattices gain more stability by coming together to form an extended hydrogen-bonded network. To combat this tendency, a dispersant having a polymer with at least one monomer unit having a hydrogen-bond donor and a hydrogen-bond acceptor is used to increase the ink formulation stability. Thus, the present disclosure illustrates ink formulations that achieve very high stability without the use of expensive dispersion processes.

Figure 1:
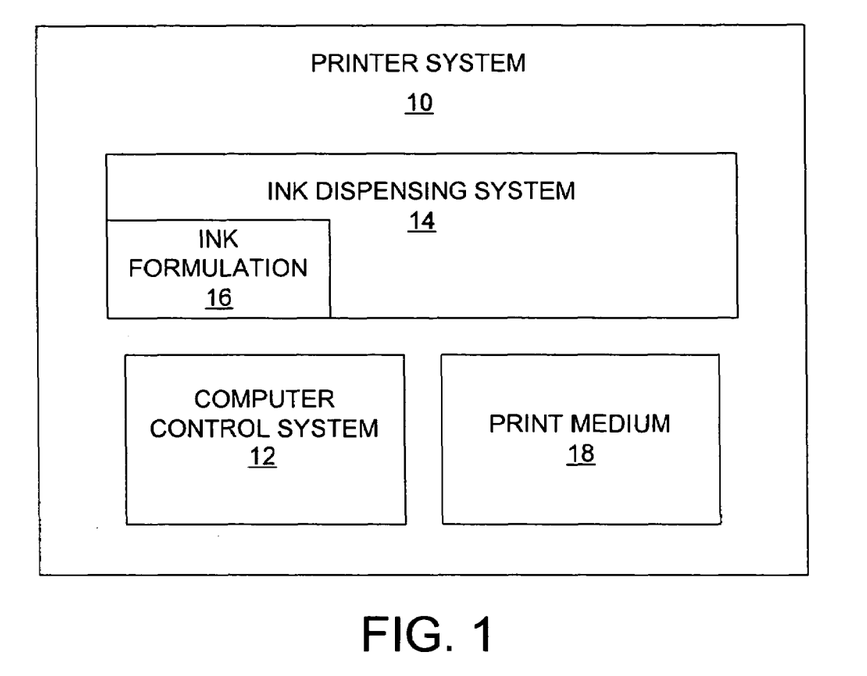
FIG. 1 illustrates an embodiment of a printer system.

FIG. 1 illustrates a block diagram of a representative printer system 10 that includes, but is not limited to, a computer control system 12, an ink dispensing system 14, and a print medium 18. The computer control system 12 includes a process control system that is operative to control the ink dispensing system 14. In particular, the computer control system 12 instructs and controls the ink dispensing system 14 to print characters, symbols, photos, etc. onto the print medium 18.

The ink dispensing system 14 includes, but is not limited to, an ink formulation 16. In addition, the ink dispensing system 14 includes ink-jet technologies and coating technologies, which dispense the ink formulation 16 (e.g., dye-based ink and pigment-based ink formulations) onto the print medium 18. Ink-jet technology, such as drop-on-demand and continuous flow ink-jet technologies, can be used to dispense the ink formulation 16. The ink dispensing system 14 can include at least one ink-jet printhead system (e.g., thermal ink-jet printhead and/or a piezo ink-jet print head) operative to dispense (e.g., jet) the ink formulation 16 through one or more of a plurality of nozzles in a printhead. The printhead system incorporates an array of firing chambers that receive the ink formulation 16 (e.g., a black pigment ink formulation and color ink formulation), which is in fluid communication with one or more ink reservoirs.

The term "print media" or "print medium" can include, but is not limited to, a paper substrate, a photobase substrate, a plastic media (e.g., clear to opaque plastic film) substrate, and the like. The print media can include, but is not limited to, a hard or flexible material made from a polymer, a paper, a glass, a ceramic, a woven cloth, or a non-woven cloth material.

The ink formulation 16 includes, but is not limited to, a pigment and a dispersant. The dispersant includes, but is not limited to, a polymer with at least one monomer unit having both a hydrogen-bond donor and a hydrogen-bond acceptor. The hydrogen-bond donor and the hydrogen-bond acceptor may be at least about 3 to 5 angstroms apart.

Figure 2:
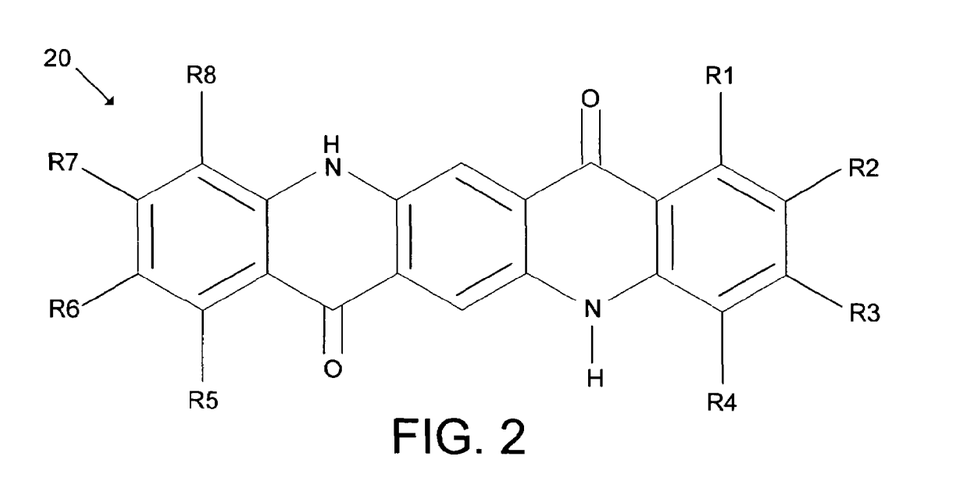
FIG. 2 illustrates an embodiment of a formula for a quinacridone pigment.

One embodiment of the pigment can include a quinacridone pigment 20 having the formula illustrated in FIG. 2, where R1, R2, R3, R4, R5, R6, R, and R8 are one or more types of atoms or functional groups. R1 through R8 can all be the same or different. They can include, but are not limited to, a methyl group, an ethyl group, other hydrocarbons, halogens (e.g., chlorine), hydrogen, and/or aromatic groups. In one embodiment, R2 and R6 can both be $CH_3$, and the quinacridone pigment 20 is termed a PR-122 pigment (2,9-dimethyl-7,14-dioxo-5,7,12,14-tetrahydro(2,3-b)quinolinoacridine), which can be purchased from Clariant and other pigment vendors. In other embodiments, R2 and R6 can both be chlorine atoms (a PR-202 pigment (2,9-dichloro-7,14-dioxo-5,7,12,14-tetrahydro(2,3-b)quinolinoacridine)) or both be hydrogen atoms (a PV-19 pigment (7,14-dioxo-5,7,12,14-tetrahydro(2,3-b)quinolinoacridine)), both of which can be purchased from Ciba Specialty Chemicals and other pigment vendors. These exemplary pigments and additional pigments and vendors are summarized in Table 1 and Table 2.

TABLE 1

| Pigment | $R_1$ | $R_2$ | $R_3$ | $R_4$ | $R_5$ | $R_6$ | $R_7$ | $R_8$ |
|---|---|---|---|---|---|---|---|---|
| P.V. 19 | H | H | H | H | H | H | H | H |
| P.R. 122 | H | $CH_3$ | H | H | H | $CH_3$ | H | H |
| P.R. 192 | H | $CH_3$ | H | H | H | H | H | H |
| P.R. 202 | H | Cl | H | H | H | Cl | H | H |
| P.R. 207 | H | H | H | Cl | H | H | H | Cl |
| P.R. 209* | H | H | Cl | H | H | H | Cl | H |

*Mixed with 1,8- and 1,10-dichloroquinacridone

TABLE 2

| Pigment | Manufacturer |
|---|---|
| P.V. 19 | Clariant, Ciba, Bayer |
| P.R. 122 | Clariant, Bayer, Ciba, Sun Chemical |
| P.R. 192 | None Known |
| P.R. 202 | Bayer, Ciba, Sun Chemical |
| P.R. 207 | DIC |
| P.R. 209* | Clariant |

The ink formulation 16 can include an amount of pigment from about 1 to 8 weight percent of the ink formulation. In one exemplary embodiment, the ink formulation includes an amount of pigment from about 3 to 4 weight percent of the ink formulation 16.

The pigment of the ink formulation 16 can include, but is not limited to, a black pigment and a color pigment. The color pigment can include, but is not limited to, blue, brown, cyan, green, white, violet, magenta, red, orange, and yellow, as well as mixtures thereof.

The polymer dispersant with at least one monomer unit having a hydrogen-bond donor and a hydrogen-bond acceptor can include, but is not limited to, ester monomers (e.g., acrylate monomers), alcohol monomers, amine monomers, carboxylic acid monomers, and aromatic monomers.

Figure 3:
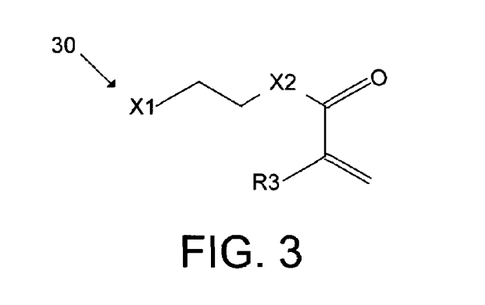
FIG. 3 illustrates an embodiment of an acrylate monomer.

One embodiment of the ink formulation 16 can include a polymer dispersant having an acrylate monomer 30 having the formula illustrated in FIG. 3, where X1, X2, and R3 can each be one or more atoms or functional groups. For example, X1 can be, but is not limited to, OH, $NH_2$, or $NHCH_3$. Likewise, X2 can be, but is not limited to, an oxygen atom, NH, or $NCH_3$. X1 and X2 include a hydrogen-bond acceptor and/or a hydrogen-bond donor. R3 can be, but is not limited to, a hydrogen atom or $CH_3$. One embodiment of the polymer dispersant can include an acrylate monomer 30 wherein X1 is OH, X2 is an oxygen atom, and R3 is $CH_3$, such that the monomer is hydroxyethyl methacrylate monomer (HEMA).

Figure 4:
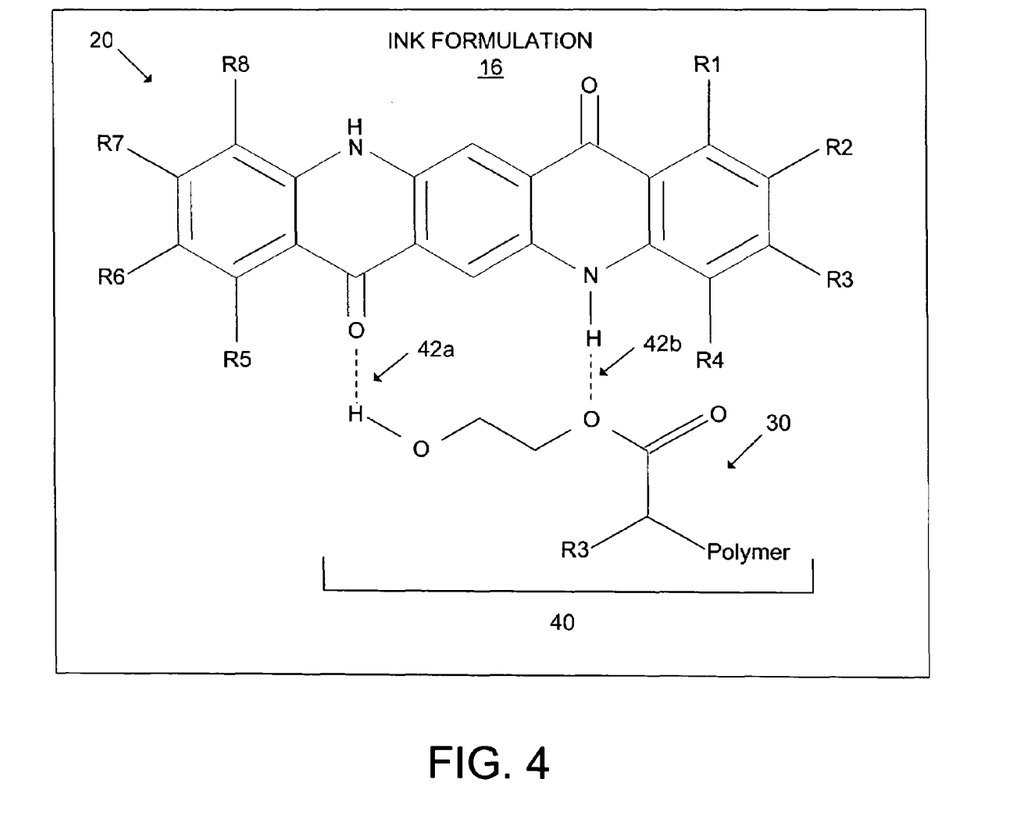
FIG. 4 illustrates an embodiment of an ink formulation of a quinacridone pigment stabilized by a polymer dispersant having an acrylate monomer.

Although not intended to be bound by theory, FIG. 4 is an illustration representing the stabilization of a quinacridone pigment 20 with a polymer dispersant 40 having an acrylate monomer 30 in an ink formulation 16. The acrylate monomer 30 has OH in the X1 position acting as a hydrogen-bond donor and an oxygen atom in the X2 position acting as a hydrogen-bond acceptor. Thus, the quinacridone pigment 20 and the polymer dispersant 40 having the acrylate monomer 30 are bonded by hydrogen bonds 42a and 42b and the ink formulation 16 is substantially stabilized.

Figure 5:
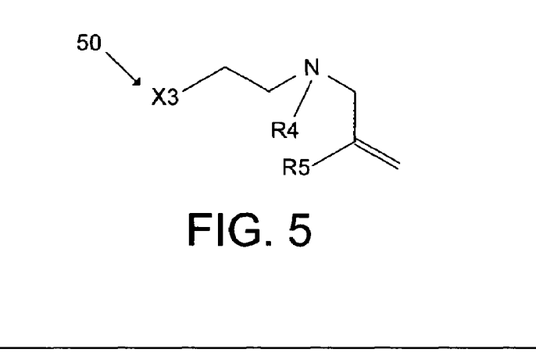
FIG. 5 illustrates an embodiment of an amine monomer.

Another embodiment of the ink formulation 16 can include a polymer dispersant having an amine monomer 50 having the formula illustrated in FIG. 5, where X3, R4, and R5 can each be one or more atoms or functional groups. X3 can be, but is not limited to, OH, $NH_2$, $NHCH_3$, or $N(CH_3)_2$. X3 includes a hydrogen-bond acceptor and/or the hydrogen-bond donor. R4 and R5 can each be, but are not limited to, a hydrogen atom or $CH_3$.

Figure 6:
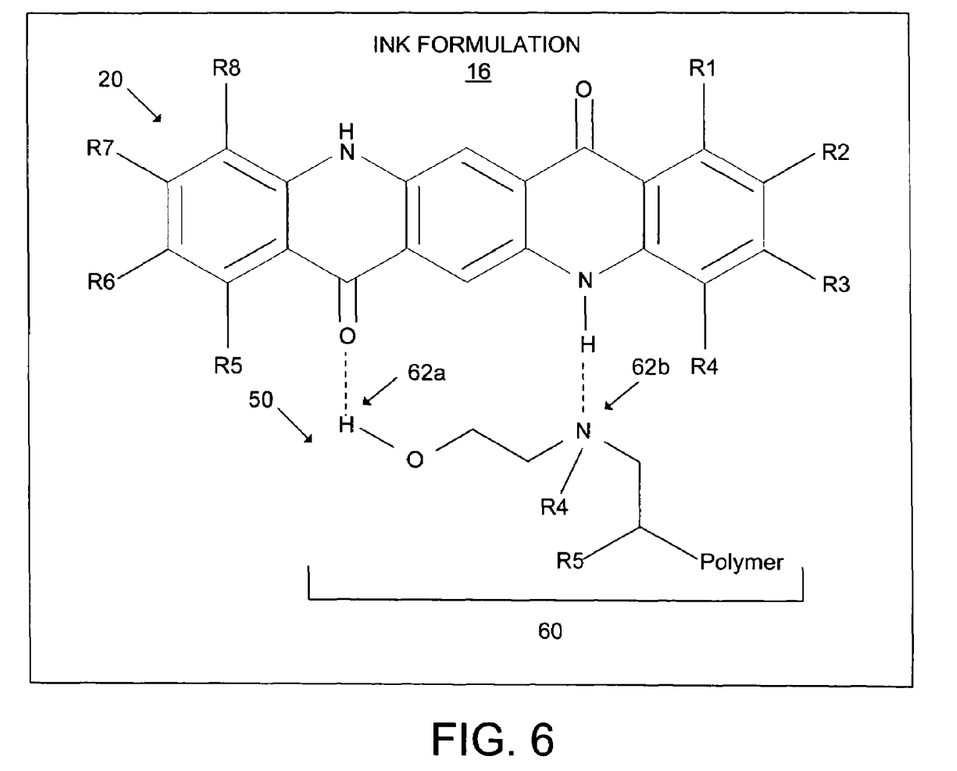
FIG. 6 illustrates an embodiment of an ink formulation of a quinacridone pigment stabilized by a polymer dispersant having an amine monomer.

Although not intended to be bound by theory, FIG. 6 is an illustration representing the stabilization of a quinacridone pigment 20 with another polymer dispersant 60 having an amine monomer 50 in an ink formulation 16. The amine monomer 50 has OH in the X3 position acting as a hydrogen-bond donor and nitrogen acting as a hydrogen-bond acceptor. Thus, the quinacridone pigment 20 and the polymer dispersant 60 having the amine monomer 50 are bonded by hydrogen bonds 62a and 62b and the ink formulation 16 is substantially stabilized.

Figure 7:
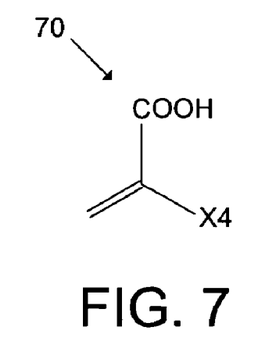
FIG. 7 illustrates an embodiment of a carboxylic acid monomer.

Yet another embodiment of the ink formulation 16 can include a polymer dispersant having a carboxylic acid monomer 70 having the formula illustrated in FIG. 7, where X4 can be one or more atoms/functional groups. For example, X4 can be, but is not limited to, $CH_2OH$, $CH_2COCH_3$, $NH_2$, $NHCH_3$, and $N(CH_3)_2$. Thus, the carboxyl group could include the hydrogen-bond donor and X4 could include the hydrogen-bond acceptor. Alternatively, the carboxyl group could include the hydrogen-bond acceptor and X4 could include the hydrogen-bond donor.

Figure 8A:
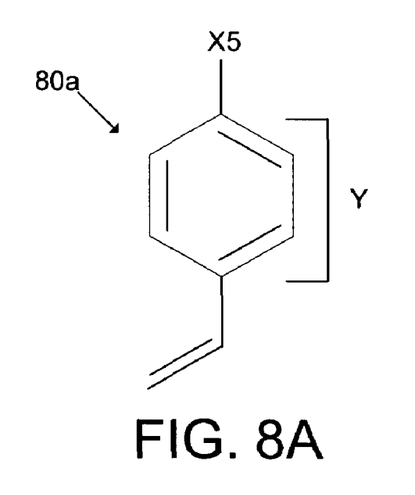
FIGS. 8A and 8B illustrate embodiments of aromatic monomers.
Figure 8B:
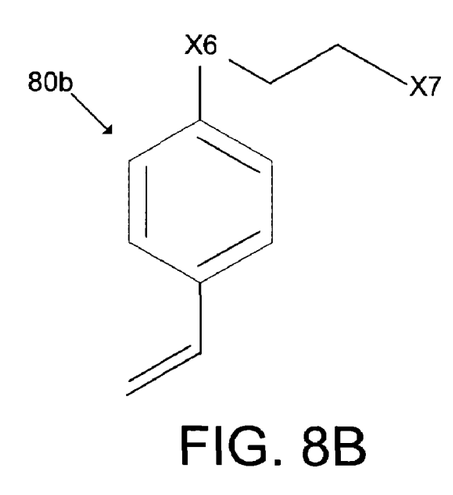

Another embodiment of the ink formulation 16 can include a polymer dispersant having an aromatic monomer 80a or 80b having the formula illustrated in FIG. 8A or FIG. 8B, where X5, X6, and X7 can each be one or more atoms or functional groups. For example, X5 can be, but is not limited to, OH, $CONH_2$, $CONHCH_3$, $NH_2$, $NHCH_3$, $N(CH_3)_2$, $CH_2OH$, $CH_2NH_2$, $CH_2NHCH_3$, and $CH_2N(CH_3)_2$. Also, X6 can be, but is not limited to, an oxygen atom, NH, $NCH_3$, $CH_2O$, $CH_2NH$, and $CH_2NCH_3$. Likewise, X7 can be, but is not limited to, OH, $CONH_2$, $CONHCH_3$, $NH_2$, $NHCH_3$, and $N(CH_3)_2$. In the aromatic monomer 80a, X5 can include a hydrogen-bond acceptor while the benzene ring Y acts as a hydrogen-bond donor by virtue of the hydrogen atoms on the ring. Alternatively, X5 can include a hydrogen-bond donor while the benzene ring Y acts as the hydrogen-bond acceptor because of its π electron cloud. In the aromatic monomer 80b, X6 could include the hydrogen-bond donor and X7 could include the hydrogen-bond acceptor. Alternatively, X6 could include the hydrogen-bond acceptor and X7 could include the hydrogen-bond donor.

Figure 9:
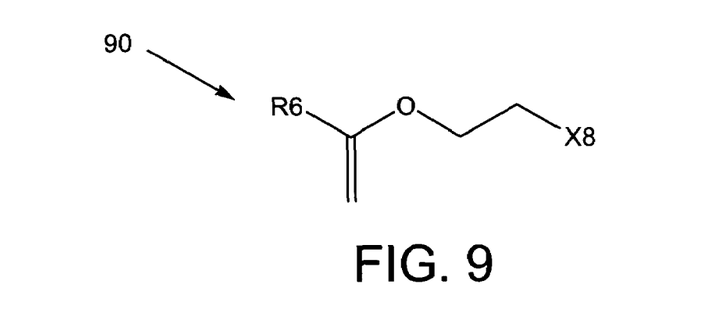
FIG. 9 illustrates an embodiment of an alkyl vinyl ether monomer.

Another embodiment of the ink formulation 16 can include a polymer dispersant having an alkyl vinyl ether monomer 90 having the formula illustrated in FIG. 9, where X8 and R6 can each be one or more atoms or functional groups. X8 can include, but is not limited to, OH, $NH_2$, $NHCH_3$, or $N(CH_3)_2$. X8 includes a hydrogen-bond acceptor and/or the hydrogen-bond donor. R8 can include, but is not limited to, a hydrogen atom or $CH_3$.

Figure 10:
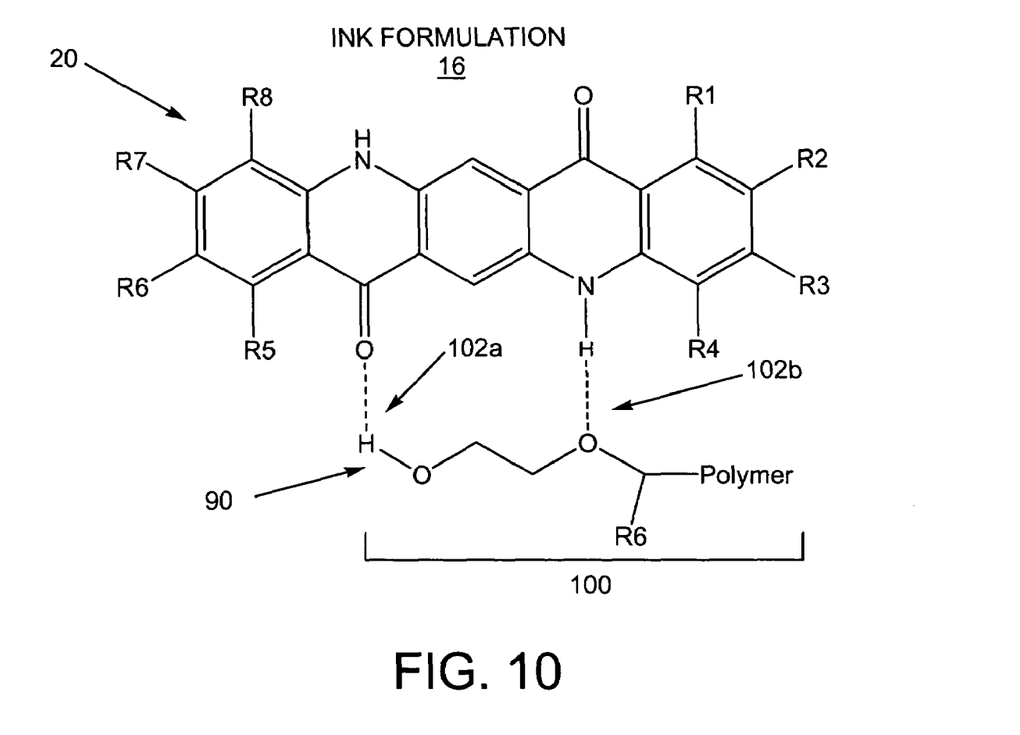
FIG. 10 illustrates an embodiment of an ink formulation of a quinacridone pigment stabilized by a polymer dispersant having an alkyl vinyl ether monomer.

Although not intended to be bound by theory, FIG. 10 is an illustration representing the stabilization of a quinacridone pigment 20 with another polymer dispersant 100 having an alkyl vinyl ether monomer 90 in an ink formulation 16. The alkyl vinyl ether monomer 90 has OH in the X8 position acting as a hydrogen-bond donor and oxygen atom acting as a hydrogen-bond acceptor. Thus, the quinacridone pigment 20 and the polymer dispersant 100 having the alkyl vinyl ether monomer 90 are bonded by hydrogen bonds 102a and 102b and the ink formulation 16 is substantially stabilized.

The ink formulation 16 can include an amount of the polymer dispersant from about 0.1 to 20 weight percent of the ink formulation 16, about 0.1 to 10 weight percent of the ink formulation 16, and about 0.5 to 3 weight percent of the ink formulation 16.

The ink formulation 16 can be an anionic, a cationic, or an amphoteric dispersion. Thus, a cationically dispersed black ink could be used with an anionically dispersed quinacridone ink in order to achieve black to color bleed control. Alternatively, when the black ink is made with anionic dispersants, use of a cationically dispersed quinacridone ink would also give substantial black to color bleed control. In one embodiment, a copolymer dispersant with a first monomer containing an amine and a second monomer containing an anionic stabilizing functional group (e.g., $SO_2OH$ and $COOH$) can be used to produce an amphoteric ink formulation 16. In another embodiment, a copolymer dispersant with a first monomer containing an amine and a second monomer containing a cationic stabilizing group can be used to produce the ink formulation 16. In yet another embodiment, a copolymer dispersant with a first monomer containing a hydroxyl group and a second monomer containing either an anionic or cationic stabilizing group can be used to produce the ink formulation 16.

In one alternative embodiment, the ink formulation 16 can include a dispersant having a copolymer with one or more types of monomer units producing one or more types of ink formulation properties. For example, a first monomer unit can have a hydrogen bond donor and a hydrogen bond acceptor to stabilize the pigment ink formulation. A second monomer unit of the copolymer can provide one or more types of ink formulation properties. The types of ink formulation properties that can be provided include, but are not limited to, gloss, durability, plain paper chroma, saturation, and combinations thereof.

In yet another alternative embodiment, a polymer dispersant can include, but is not limited to, vinyl alcohol or partially hydrolyzed polyvinylacetate in a copolymer.

In addition, the ink formulation 16 can include, but is not limited to, surface-active compounds, solvents, aqueous solution salts, buffers, biocides, binders, and combinations thereof.

The surface-active compound can include, but is not limited to, propoxylated fatty acids, propoxylated alchohols, ethoxylated fatty acids, ethoxylated alcohols, alkyl phenols, and combinations thereof. In particular, the surface-active compound can include, Antarox™ AA-60, Antorox™ L62, Alcodet™ IL-3500, Antorox™ BL, Antarox™ LA-EP, and Antarox™ LF-224, all of which can be purchased from Rhone-Poulenc Inc.

The solvent can include, but is not limited to, water soluble organic solvents. The water soluble organic solvents can include, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol) alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to, ethoxylated glycerol, 2-methyl-1,3-propanediol; 2-methyl-2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5-diol; trimethylol propane, 3-hexyne-2,5-diol; sulfolane; 3-pyridyl carbinol; and other pyridine derivatives. In addition, the solvents can be added to reduce the rate of evaporation of water in the ink-jet to minimize clogging or other properties of the ink such as viscosity, pH, surface tension, optical density, and print quality.

The salt can include, but is not limited to, ammonium, potassium, or lithium benzoate salts; ammonium, potassium, or lithium acetates; ammonium, potassium, or lithium xylene sulfonate salts; nitrates of $NH_4$, sodium, lithium, and potassium; lactates of ammonium, potassium, or lithium; citrates of ammonium, potassium, or lithium; carbonates of sodium, lithium, and potassium; diphosphates of sodium, lithium, and potassium; triphosphates of sodium, lithium, and potassium; and mixtures thereof. In addition, the salt can include sodium, lithium, and potassium salts of compounds such as, but not limited to, citrate, succinate, lactate, formate, gluconate, tartrate, malonate, fumarate, malate, sebacate, laurate, glutarate, acetate, oxalate, adipate, pimelate, suberate, azelate, and mixtures thereof.

Various buffers or pH adjusting agents can also be optionally used in the ink formulation. The buffering agent can include, but are not limited to, hydroxides of alkali metals and amines (e.g., lithium hydroxide, sodium hydroxide, potassium hydroxide, and citric acid); amines (e.g., triethanolamine, diethanolamine, and dimethylethanolamine); hydrochloric acid; and other basic or acidic components which do not substantially interfere with the bleed control or optical density characteristics. In addition, commercially available pH buffers can also be used and are available from Sigma Aldrich (e.g., MES, MOPs, Trizma, Bis-Tris, MOPSO, TES, TAPSO, TEA, TRICINE, BICINE, TAPS, and AMPSO, in the acid or salt form).

Various biocides can be used to inhibit growth of undesirable microorganisms. The biocides can include, but are not limited to, benzoate salts, sorbate salts, commercial products such as NUOSEPT™ (Nudex, Inc., a division of Huls America), UCARCIDE™ (Union Carbide), VANCIDE (RT Vanderbilt Co.), and PROXEL™ (ICI Americas), and other biocides.

Various surfactants can be used in the ink formulation 16. The surfactant can include, but are not limited to, anionic, non-ionic, and zwitterionic surfactants. The anionic surfactant can include, but is not limited to, sodium or potassium salts of straight chain fatty acids; sodium and potassium salts of coconut oil fatty acids; sodium and potassium salts of tall oil fatty acids; amine salts; acylated polypeptides; linear alkyl benzene sulfonates; higher alkyl benzene sulfonates; benzene; toluene; xylene; cumenesulfonate; lignosulfonates; petroleum sulfonates; N-acyl-n-alkyltaurates; paraffin sulfonates; secondary n-alkanesulfonates; alpha olefin sufonates; sulfosuccinic esters; alkyl naphthalene sulfonates; isoethionates; sulfuric acid ester salts; sulfated polyoxyethylenated straight-chain alcohols; sulfated triglycerides oils; phosphoric and polyphosphoric acid esters; and perfluorinated anionic surfactants.

The non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, aklanolamine condensates, alkanolamides, tertiary acetylenic glycols, polyoxyethylenated silicones, N-alkylpyrrolidones, and alkylpolyglycosides.

The zwitterionic surfactant can include, but is not limited to, beta-N-alkylaminopropionic acids, N-alkyl-beta-iminodipropionic acids, imidazoline carboxylates, N-alkylbetaines, amine oxides, sulfobetaines, and surfactants.

In addition, binders can be included in the ink formulation, which act to secure the ink on the print medium. The binders can include, but are not limited to, compounds having molecular weight (MW) of from about 200 MW to about 10000 MW. The binders can include, but are not limited to, polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

The ink formulation 16 can be used in conjunction with one or more inks in an ink-jet ink set having one or more ink formulations in a printer system 10. For example, the ink set can include the ink formulation 16 and a second ink formulation. In other embodiments, the ink set can include the ink formulation 16 and a plurality of ink formulations. The ink formulation 16 and the one or more inks can be used in the same printhead or in one or more printheads.

The ink formulation 16 can include, but is not limited to, dye-based inks and pigment-based inks. The dye-based inks and pigment-based inks may be nonionic, cationic, anionic, or mixtures thereof. Color dye-based inks and pigment-based inks for use in ink-jet printing may be employed in the practice of this disclosure. The color inks can include a large number of water-soluble acid and direct dyes.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

What is claimed is:

1. An ink formulation, comprising:

a pigment; and a dispersant polymer having at least one monomer unit, wherein the monomer unit has both a hydrogen-bond donor and a hydrogen-bond acceptor, wherein the at least one monomer unit is an amine monomer having the formula:

wherein X3 is selected from: OH, NH$_2$, NHCH$_3$, or N(CH$_3$)$_2$, wherein each of R4 and R5 are independently selected from H or CH$_3$.

2. The ink formulation of claim 1, wherein the pigment includes a quinacridone pigment having the formula:

wherein R1, R2, R3, R4, R5, R6, R7, and R8 are each selected from: CH$_3$, Cl, or H.

3. The ink formulation of claim 1, wherein the pigment is in an amount from about 1 to 8 weight percent of the pigment ink formulation; and the polymer having the monomer unit is in an amount from about 0.1 to 20 weight percent of the self-dispersed pigment ink formulation.

4. The ink formulation of claim 1, wherein the at least one monomer unit has a hydrogen-bond donor spaced at least about 3 angstroms to 5 angstroms from a hydrogen-bond acceptor.

5. The ink formulation of claim 1, wherein the dispersant polymer having at least one monomer unit is a copolymer, wherein a first monomer unit has both the hydrogen-bond donor and the hydrogen-bond acceptor and a second monomer unit produces at least one type of ink formulation property selected from: gloss, durability, plain paper chroma, saturation, or combinations thereof.

6. An ink-jet ink set, comprising:
an ink formulation having a pigment and a dispersant polymer having at least one monomer unit, wherein the monomer unit has both a hydrogen-bond donor and a hydrogen-bond acceptor:
wherein the at least one monomer unit is selected from:
an alkyl vinyl ether monomer having the formula:

wherein R6 is selected from: H, CH$_3$ and alkyl, and X8 is selected from: OH, NH$_2$, NHCH$_3$, or, N(CH$_3$)$_2$;
a carboxylic acid monomer having the formula:

wherein X4 is selected from: CH$_2$OH, CH$_2$COCH$_3$, NH$_2$, NHCH$_3$, or N(CH$_3$)$_2$;

an aromatic monomer having the formula:

wherein X6 is selected from: an oxygen atom, NH, NCH$_3$, CH$_2$O, CH$_2$NH, or CH$_2$NCH$_3$; and wherein X7 is selected from: OH, CONH$_2$, CONHCH$_3$, NH$_2$, NHCH$_3$, N(CH$_3$)$_2$; or an amine monomer having the formula:

wherein X3 is selected from: OH, NH$_2$, NHCH$_3$, or N(CH$_3$)$_2$, wherein each of R4 and R5 are independently selected from H or CH$_3$.

7. A method of stabilizing an ink formulation, comprising:
providing a pigment; and
providing a dispersant polymer having at least one monomer unit, wherein the monomer unit has both a hydrogen-bond donor and a hydrogen-bond acceptor, wherein the hydrogen bond donor and the hydrogen bond acceptor each form hydrogen bonds with the pigment, and wherein the pigment is substantially stabilized:
wherein the at least one monomer unit is selected from:
an alkyl vinyl ether monomer having the formula:

wherein R6 is selected from: H, CH$_3$ or alkyl, and X8 is selected from: OH, NH$_2$, NHCH$_3$, or N(CH$_3$)$_2$;
a carboxylic acid monomer having the formula:

wherein X4 is selected from: CH$_2$OH, CH$_2$COCH$_3$, NH$_2$, NHCH$_3$, or N(CH$_3$)$_2$;
an aromatic monomer having the formula:

wherein X6 is selected from: an oxygen atom, NH, NCH$_3$, CH$_2$O, CH$_2$NH, or CH$_2$NCH$_3$; and wherein X7 is selected from: OH, CONH$_2$, CONHCH$_3$, NH$_2$, NHCH$_3$, or N(CH$_3$)$_2$; or an amine monomer having the formula:

wherein X3 is selected from: OH, NH, NH$_2$, NHCH$_3$, or N(CH$_3$)$_2$, wherein each of R4 and R5 are independently selected from H or CH$_3$.

8. A printer system, comprising:
a dispensing system including at least one printhead, wherein the printhead includes an ink formulation, comprising:
a pigment; and
a dispersant polymer having at least one monomer unit, wherein the monomer unit has both a hydrogen-bond donor and a hydrogen-bond acceptor;
wherein the at least one monomer unit is selected from:
an alkyl vinyl ether monomer having the formula:

wherein R6 is selected from: H, CH$_3$ or alkyl, and X8 is selected from: OH, NH$_2$, NHCH$_3$, or N(CH$_3$)$_2$;
a carboxylic acid monomer having the formula:

wherein X4 is selected from: CH$_2$OH, CH$_2$COCH$_3$, NH$_2$, NHCH$_3$, or N(CH$_3$)$_2$;
an aromatic monomer having the formula:

wherein X6 is selected from: an oxygen atom, NH, NCH$_3$, CH$_2$O, CH$_2$NH, or CH$_2$NCH$_3$; and wherein X7 is selected from: OH, CONH$_2$, CONHCH$_3$, NH$_2$, NHCH$_3$, or N(CH$_3$)$_2$; or
an amine monomer having the formula:

wherein X3 is selected from: OH, NH$_2$, NHCH$_3$, or N(CH$_3$)$_2$, wherein each of R4 and R5 are independently selected from H or CH$_3$.

9. An ink formulation, comprising:
a pigment; and
a dispersant polymer having at least one monomer unit, wherein the monomer unit has both a hydrogen-bond donor and a hydrogen-bond acceptor, wherein the at least one monomer unit is an alkyl vinyl ether monomer having the formula:

wherein R6 is selected from: H, CH$_3$ or alkyl, and X8 is selected from: OH, NH$_2$, NHCH$_3$, or N(CH$_3$)$_2$.

10. The ink formulation of claim 9, wherein the pigment includes a quinacridone pigment having the formula:

wherein R1, R2, R3, R4, R5, R6, R7, and R8 are each selected from: CH$_3$, Cl, or H.

11. The ink formulation of claim 9, wherein the pigment is in an amount from about 1 to 8 weight percent of the pigment ink formulation; and the polymer having the monomer unit is in an amount from about 0.1 to 20 weight percent of the self-dispersed pigment ink formulation.

12. An ink formulation, comprising:
a pigment; and
a dispersant polymer having at least one monomer unit, wherein the monomer unit has both a hydrogen-bond donor and a hydrogen-bond acceptor, wherein the at least one monomer unit is a carboxylic acid monomer having the formula:

wherein X4 is selected from: CH$_2$OH, CH$_{2COCH3}$, NH$_2$, NHCH$_3$, or N(CH$_3$)$_2$.

13. The ink formulation of claim 12, wherein the pigment includes a quinacridone pigment having the formula:

wherein R1, R2, R3, R4, R5, R6, R7, and R8 are each selected from: CH$_3$, Cl, or H.

14. The ink formulation of claim 13, wherein the pigment is in an amount from about 1 to 8 weight percent of the pigment ink formulation; and the polymer having the monomer unit is in an amount from about 0.1 to 20 weight percent of the self-dispersed pigment ink formulation.

15. An ink formulation, comprising:
a pigment; and
a dispersant polymer having at least one monomer unit, wherein the monomer unit has both a hydrogen-bond donor and a hydrogen-bond acceptor, wherein the at least one monomer unit is an aromatic monomer having the formula:

wherein X6 is selected from: an oxygen atom, NH, NCH$_3$, CH$_2$O, CH$_2$NH, or CH$_2$NCH$_3$; and wherein X7 is selected from: OH, CONH$_2$, CONHCH$_3$, NH$_2$, NHCH$_3$, or N(CH$_3$)$_2$.

16. The ink formulation of claim 15, wherein the pigment includes a quinacridone pigment having the formula:

wherein R1, R2, R3, R4, R5, R6, R7, and R8 are each selected from: $CH_3$, Cl, or H.

17. The ink formulation of claim 16, wherein the pigment is in an amount from about 1 to 8 weight percent of the pigment ink formulation; and the polymer having the monomer unit is in an amount from about 0.1 to 20 weight percent of the self-dispersed pigment ink formulation.

* * * * *

UNITED STATES PATENT AND TRADEMARK OFFICE
CERTIFICATE OF CORRECTION

PATENT NO. : 7,449,502 B2  
APPLICATION NO. : 11/059039  
DATED : November 11, 2008  
INVENTOR(S) : Sundar Vasudevan It is certified that error appears in the above-identified patent and that said Letters Patent is hereby corrected as shown below:

In column 9, line 47, in Claim 6, delete "acceptor:" and insert -- acceptor; --, therefor.

In column 10, line 34, in Claim 7, delete "stabilized:" and insert -- stabilized; --, therefor.

In column 11, line 7, in Claim 7, after "OH," delete "NH,".

In column 12, line 29, in Claim 12, delete "$CH_{2COCH3}$," and insert -- $CH_2COCH_3$, --, therefor.

Signed and Sealed this

Twenty-second Day of June, 2010

David J. Kappos  
*Director of the United States Patent and Trademark Office*